(12) United States Patent
Iizuka

(10) Patent No.: US 7,976,044 B2
(45) Date of Patent: Jul. 12, 2011

(54) SHOCK ABSORBER, STRADDLE TYPE VEHICLE AND MANUFACTURING METHOD FOR SHOCK ABSORBER

(75) Inventor: Toshio Iizuka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 688 days.

(21) Appl. No.: 11/846,129

(22) Filed: Aug. 28, 2007

(65) Prior Publication Data

US 2008/0060863 A1 Mar. 13, 2008

(30) Foreign Application Priority Data

Aug. 31, 2006 (JP) ................................. 2006-236505
Jun. 20, 2007 (JP) ................................. 2007-163032

(51) Int. Cl.
*B62K 21/00* (2006.01)
*B62K 25/00* (2006.01)
(52) U.S. Cl. ..................... 280/276; 280/279; 280/284
(58) Field of Classification Search .................. 280/276, 280/279, 284
See application file for complete search history.

(56) References Cited

U.S. PATENT DOCUMENTS

| | | | |
|---|---|---|---|
| 4,138,132 A | | 2/1979 | Doyle |
| 4,260,170 A | * | 4/1981 | Terai et al. .................. 280/276 |
| 4,278,266 A | * | 7/1981 | Inoue et al. .................. 280/276 |
| 4,625,985 A | * | 12/1986 | Nakano et al. .................. 280/276 |
| 5,323,869 A | * | 6/1994 | Kurayoshi et al. ............ 180/219 |
| 5,908,200 A | * | 6/1999 | Stewart .................... 280/276 |
| 5,954,355 A | * | 9/1999 | Hsu .................... 280/276 |
| 6,036,212 A | * | 3/2000 | Baldomero .................... 280/276 |
| 6,607,185 B2 | * | 8/2003 | Graves et al. .............. 267/64.26 |
| 7,178,820 B2 | * | 2/2007 | Terblanche .................... 280/276 |
| 7,185,905 B2 | * | 3/2007 | Czysz .................... 280/276 |
| 2004/0201145 A1 | * | 10/2004 | Chen .................... 267/64.11 |
| 2005/0051993 A1 | | 3/2005 | Ito et al. |

FOREIGN PATENT DOCUMENTS

| | | | |
|---|---|---|---|
| DE | 2721798 A | * | 11/1977 |
| DE | 202005002541 U1 | | 10/2005 |
| JP | 61-186500 A2 | | 8/1986 |
| JP | 06270875 A | * | 9/1994 |
| JP | 2005282589 A | | 10/2005 |

OTHER PUBLICATIONS

European Search Report for Application No. EP 07 25 3404 dated Apr. 8, 2008.

* cited by examiner

*Primary Examiner* — Kevin Hurley
*Assistant Examiner* — Marc A Scharich
(74) *Attorney, Agent, or Firm* — Keating & Bennett, LLP

(57) ABSTRACT

A shock absorber is provided having an exterior that looks like a two-piece structure formed with an outer tube and a separate bracket without using the separate bracket. Also provided is a straddle type vehicle having a shock absorber and a manufacturing method for the shock absorber. The shock absorber comprises a cylindrical outer tube, wherein the outer tube includes a first cylindrical part, and a second cylindrical part having an outer surface roughness greater than the outer surface roughness of the first part. The first part and the second part are adjacent each other in a longitudinal direction of the outer tube, and the second part has an equipment attaching section adapted for attaching a piece of equipment.

15 Claims, 5 Drawing Sheets

SHOCK ABSORBER, STRADDLE TYPE VEHICLE AND MANUFACTURING METHOD FOR SHOCK ABSORBER

TECHNICAL FIELD

The present invention relates to a shock absorber having an outer tube, a straddle type vehicle having the shock absorber and a manufacturing method for the shock absorber.

BACKGROUND

In straddle type vehicles, such as, for example, motorcycles, a shock absorber for absorbing shocks received by a wheel (for example, a front wheel) is widely used. With respect to shock absorbers used as a fork member of a front fork of a straddle type vehicle, there exists a normal stand type fork in which a generally cylindrical outer tube is disposed below an inner tube and a reverse stand type fork in which an outer tube is disposed above an inner tube.

In order to enhance the weather resistance of such a shock absorber used in the front fork of a straddle type vehicle, a method for anodizing the outer surface of the outer tube is known.

Also, generally, in the reverse stand type fork, the outer surface of the inner tube is machined, and a brake caliper and/or a front fender (mud guard) for the front wheel are attached to the inner tube via a separate bracket.

Another method is also known in which, the appearance of a reverse stand type fork is produced using a normal stand type fork having an outer tube whose outer surface is worked by machining and then a separate bracket is attached to the outer tube for attaching a brake caliper and/or the front fender.

SUMMARY

In the normal stand type fork having a shock absorber with an outer tube whose outer surface is worked by machining and a separate bracket is attached to the outer tube, a two-piece structure which includes an outer tube and a separate bracket is required. Accordingly, the manufacturing costs are increased for such a structure.

Therefore, one object of the present invention is to provide a shock absorber having an exterior that looks like a two-piece structure formed with an outer tube and a separate bracket without using the separate bracket, a straddle type vehicle having the shock absorber and a manufacturing method for the shock absorber.

To this end, in a first aspect of the present invention a shock absorber (e.g., shock absorber 400L of front fork 40) is provided having a cylindrical outer tube (e.g., outer tube 410L), in which the outer tube includes a first cylindrical part (e.g., small diameter sections 440L, 460L) and a second cylindrical part (e.g., large diameter sections 430L, 450L) having an outer surface roughness greater than an outer surface roughness of the first part; the first part and the second part being adjacent each other in a longitudinal direction of the outer tube; and the second part has an equipment attaching section (e.g., brake caliper attaching sections 431, 451) to which a piece of equipment (for example, a brake caliper 21a) may be attached.

According to the shock absorber described above, the first part has less outer surface roughness and, as a result, preferably more luster than the second part. Also, the second part has the equipment attaching section to which a piece of equipment, such as a brake caliper, may be attached. Therefore, a shock absorber is formed having an exterior that looks like it was formed from a two-piece structure comprising an outer tube and a separate bracket without actually using a separate bracket.

In addition, if the shock absorber is used in a normal stand type fork, the shock absorber can produce the image or appearance of a reverse stand type fork because the first part of the outer tube has more luster than the second part. That is, although using a normal stand type fork, the image or appearance of a reverse stand type fork can be produced.

In a second embodiment of the shock absorber, the outer surface of the second part is shot blasted.

In a third embodiment, the outer surface of the first part is machined.

In a fourth embodiment, the equipment attaching section is preferably adapted to attach a brake caliper (e.g., brake caliper 21a) of a disk type brake (e.g., front disk brake 21) to the shock absorber.

In a fifth embodiment, the equipment attaching section (e.g., fender attaching section 452, 453) is adapted to attach a mud guard (e.g., front fender 22) to the shock absorber.

In a sixth embodiment, an outer surface of the outer tube, preferably including the first part and the second part, is anodized.

In a seventh embodiment, the outer surface of the outer tube is anodized using a black anodization treatment.

In another aspect of the present invention, a straddle type vehicle (e.g., motorcycle 10) is provided that has the shock absorber according to any one of the first through seventh embodiments.

Preferably the shock absorber further includes an axle supporting section (e.g., axle supporting section 420L) for supporting an axle (e.g., axle 20a) of a front wheel (e.g., front wheel 20), that the first part (e.g., small diameter portion 440L) of the outer tube is positioned between an upper second part (e.g., large diameter portion 450L) and a lower second part (e.g., large diameter portion 430L), and that the axle supporting section is positioned below the lower second part.

In yet another aspect of the present invention, a manufacturing method for a shock absorber having a cylindrical outer tube is provided. According to one embodiment, the method includes a step (S10) of casting the outer tube, a step (S20) of shot blasting the outer surface of the outer tube, and a step (S30) of machining a portion of the outer surface of the outer tube.

In another embodiment, the method further includes a step (S40) of anodizing the outer surface of the outer tube after the machining step.

Preferably the outer surface of the outer tube is anodized using a black anodization treatment.

In yet a further embodiment, at least a portion of the outer tube that is not machined has an equipment attaching section (for example, brake caliper attaching sections 431, 451) to which a piece of equipment provided for the straddle type vehicle may be attached.

According to the above features of the present invention, a shock absorber having an exterior that looks like a two-piece structure formed with an outer tube and a separate bracket may be provided without actually using a separate bracket. In addition, a straddle type vehicle having the shock absorber and a manufacturing method for the shock absorber can also be provided.

DESCRIPTION OF PREFERRED EMBODIMENTS

Description will be hereinafter made of one embodiment of a straddle-type vehicle according to the present invention with reference to the drawings.

Additionally, in the following descriptions of the drawings, the same or similar portions are assigned with the same or similar reference symbols. It should be noted that each drawing is a schematic diagram, and may represent different dimensional ratios and the like from those of the actual vehicle.

Hence, specific dimensions and the like should be determined in consideration of the following descriptions. Furthermore, as a matter of course, different drawings include elements which have different dimensional relations and ratios.

Figure 1:
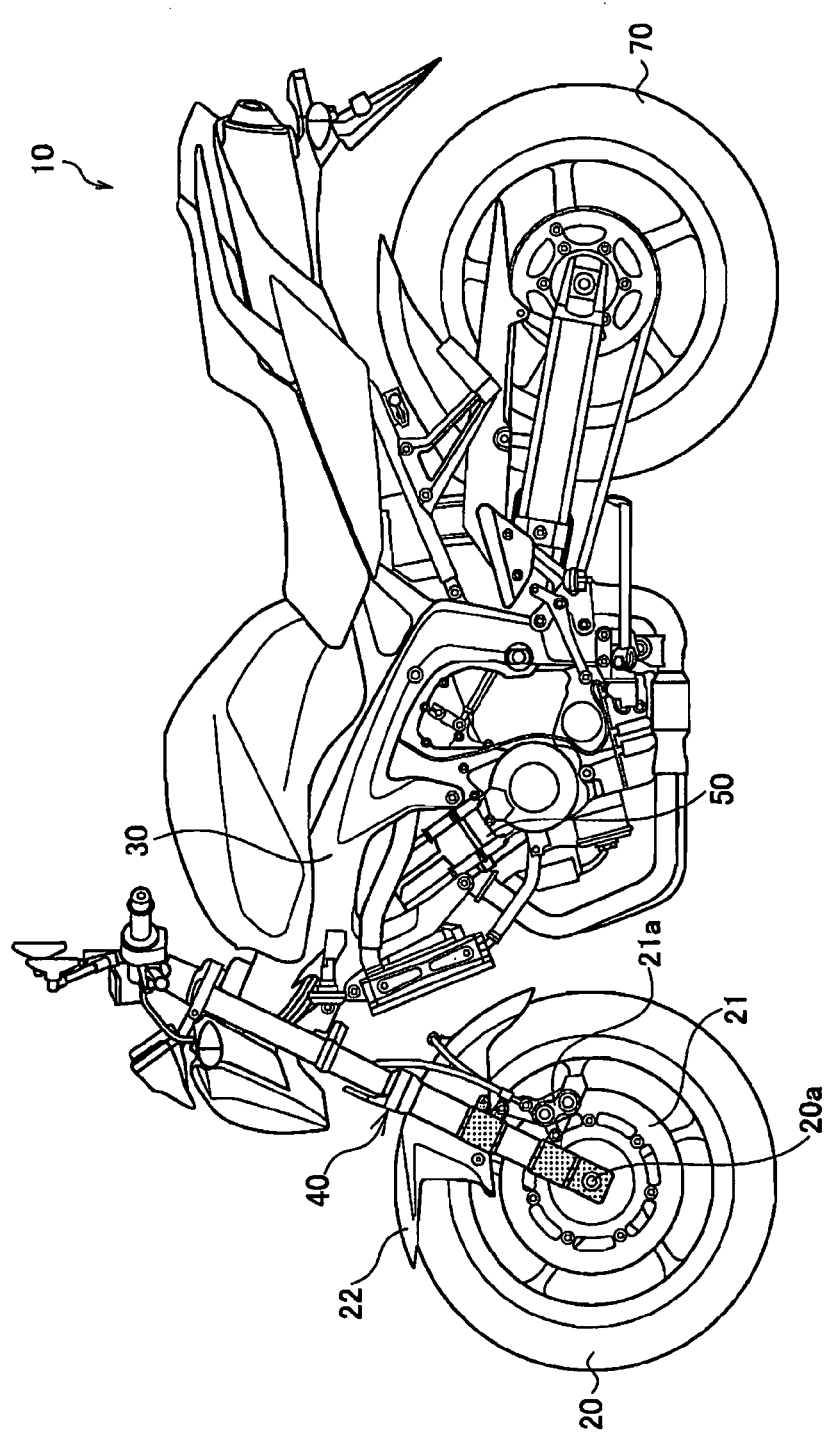
FIG. 1 is a left side elevational view of a motorcycle constructed in accordance with an embodiment of the present invention.
Figure 2:
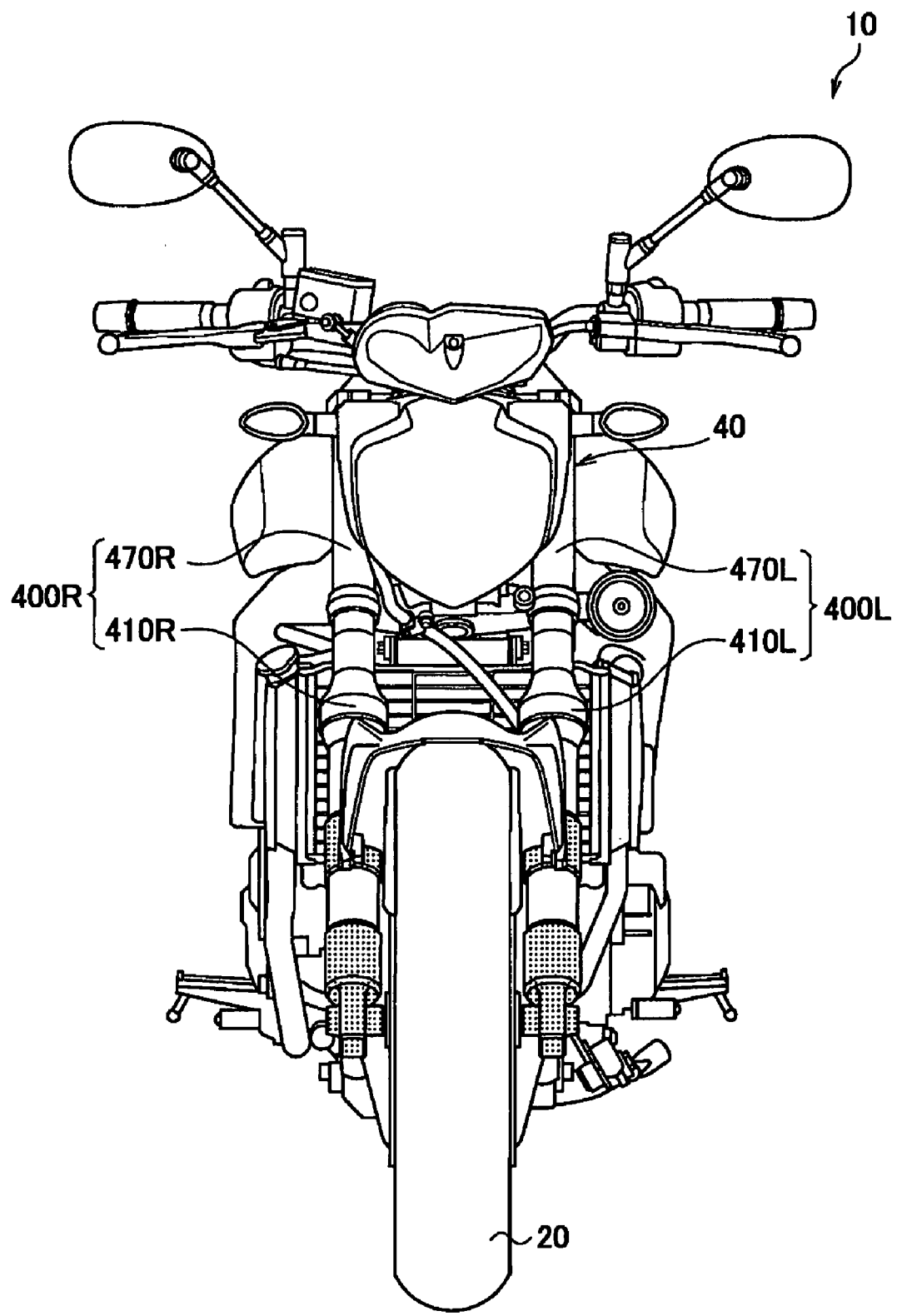
FIG. 2 is a front elevational view of the motorcycle constructed in accordance with an embodiment of the present invention.

FIG. 1 is a left side elevational view of a motorcycle 10 which is a straddle type vehicle constructed in accordance with the present invention. FIG. 2 is a front view of the motorcycle 10.

As shown in FIGS. 1 and 2, the motorcycle 10 has a front wheel 20 and a rear wheel 70. The driving force generated by an engine 50 drives the rear wheel 70.

A front fork 40 supports the axle 20a of the front wheel 20 for rotation. The front fork 40 is coupled with a steering shaft (not shown). A vehicle frame 30 supports the steering shaft for pivotal movement.

The front fork 40 comprises a left and right shock absorber 400L, 400R provided for the motorcycle 10. The front fork 40 thus allows the front wheel 20 to move (in a reciprocal motion) in a vertical direction (actually, in a direction with a certain caster angle) in response to changes of road conditions to absorb shocks which the front wheel 20 receives.

As shown in FIG. 2, the front fork 40 is formed with a left side shock absorber 400L forming a left fork member and a right side shock absorber 400R forming a right side fork member. The left side shock absorber 400L is formed with a cylindrical outer tube 410L and a cylindrical inner tube 470L. Similarly, the right side shock absorber 400R is formed with a cylindrical outer tube 410R and a cylindrical inner tube 470R.

That is, the front fork 40 is a normal stand type fork in which the outer tubes 410L, 410R are positioned below the inner tubes 470L, 470R.

The motorcycle 10 has a front disk brake 21 which is a disk type brake for braking the front wheel 20. A brake caliper 21a forming the front disk brake 21 is attached to the front fork 40.

Also, the motorcycle 10 preferably has a front fender 22 (mud guard) preventing mud or the like raised by the front wheel 20 from scattering. The front fender 22 is attached to the front fork 40.

Figure 3:
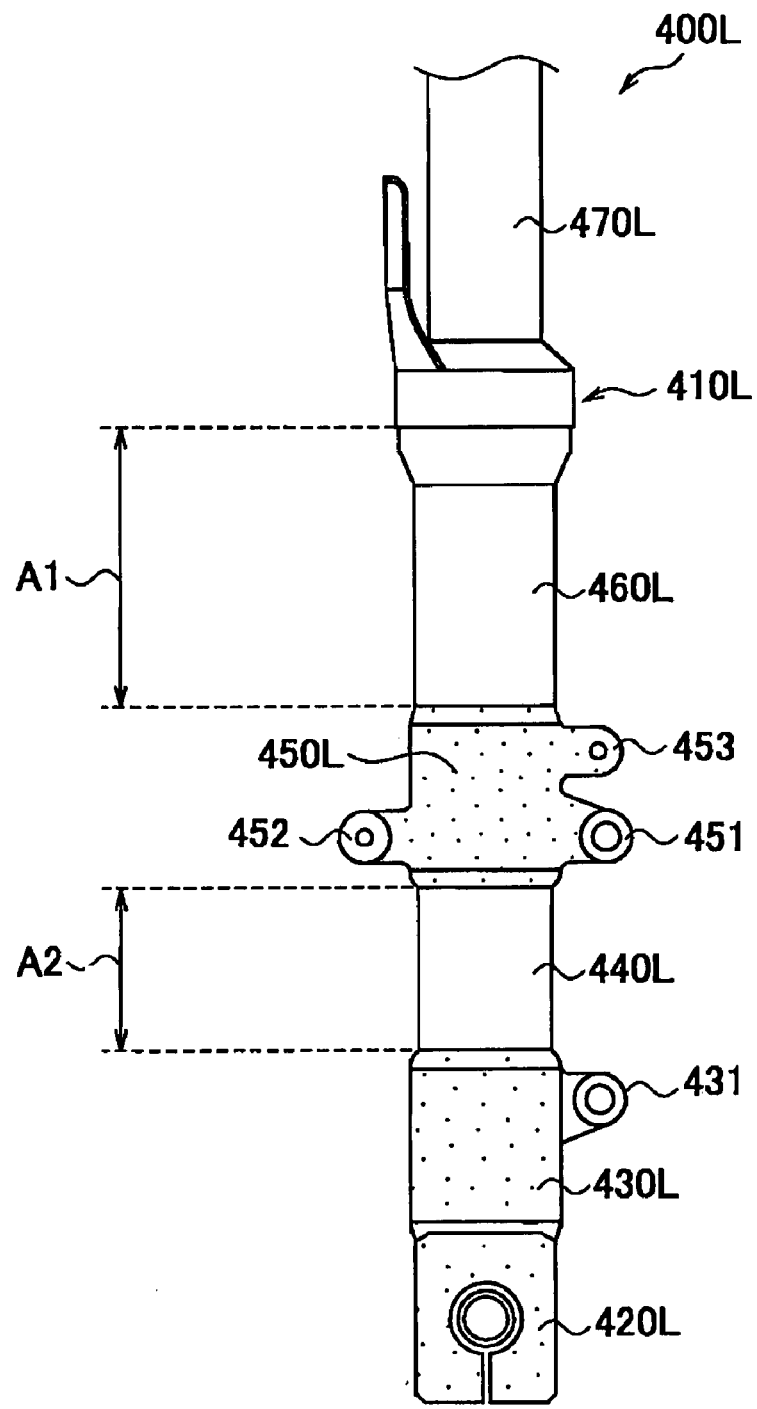
FIG. 3 is a side elevational view of a shock absorber constructed in accordance with the embodiment of the present invention.
Figure 4:
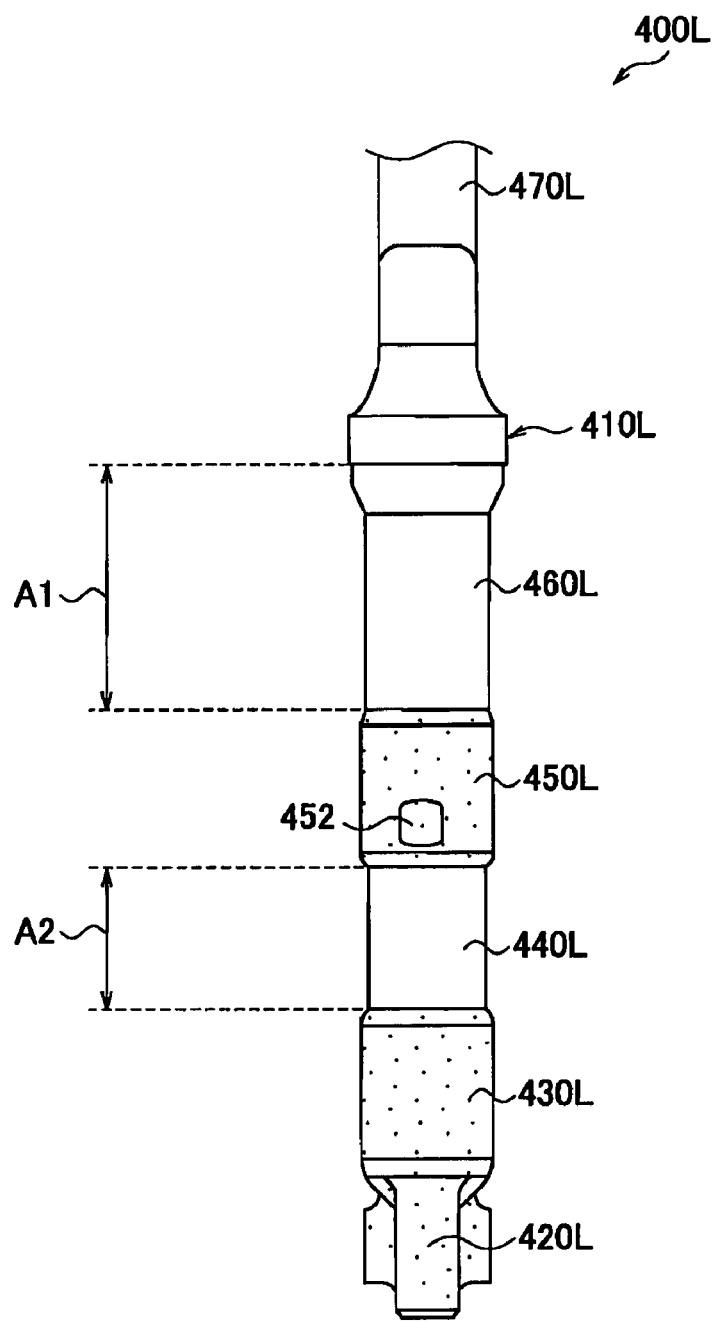
FIG. 4 is a front elevational view of the shock absorber constructed in accordance with the embodiment of the present invention.

A specific structure of shock absorber 400L according to one embodiment of the present invention will now be described in connection with FIGS. 3 and 4. FIG. 3 is a side elevational view of the left side shock absorber 400L forming the left side fork member of the front fork 40. FIG. 4 is a front elevational view of the left side shock absorber 400L.

The left side shock absorber 400L is formed with the outer tube 410L and the inner tube 470L. As described above, the outer tube 410L is positioned below the inner tube 470L.

In this embodiment, the outer surface of the outer tube 410L is preferably anodized, preferably using a black anodization treatment.

The outer tube 410L is formed with an axle supporting section 420L, a large diameter section 430L, a small diameter section 440L, a large diameter section 450L and a small diameter section 460L.

The axle supporting section 420L supports the axle 20a for rotation. The large diameter section 430L is positioned above the axle supporting section 420L. The small diameter section 440L is positioned above the large diameter section 430L.

Further, the large diameter section 450L is positioned above the small diameter section 440L. The small diameter section 460L is positioned above the large diameter section 450L. The small diameter sections 440L, 460L and the large diameter sections 430L, 450L are of a cylindrical shape.

The outer surface roughness of the small diameter sections 440L, 460L is less than that of the large diameter sections 430L, 450L. In this embodiment, the small diameter sections 440L, 460L form a first part and the large diameter sections 430L, 450L form a second part. The small diameter sections 440L, 460L are formed in the outer tube in the present embodiment by machining the outer surface of the outer tube 410L. More specifically, area A1 and an area A2 of the outer tube 410L are machined to form small diameter sections 440L, 460L. Since the outer surfaces of the small diameter sections 440, 460L are machined, the small diameter sections 440, 460L have more luster than the large diameter sections 430L, 450L.

The large diameter sections 430L, 450L have outer diameters larger than those of the small diameter sections 440L, 460L. Unlike the small diameter sections 440L, 460L, preferably no machining is made on the large diameter sections 430L, 450L. As a result, the large diameter sections 430L, 450L have greater outer surface roughness and less luster than the small diameter sections 440L, 460L. In this embodiment, the large diameter sections 430L, 450L form a second part.

As best seen in FIGS. 3 and 4, the first part and the second part are adjacent each other in a longitudinal direction of the outer tube 410L of the left shock absorber 400L. Specifically, the small diameter section 440L (first part) neighbors the large diameter section 430L (second part) and is positioned above the large diameter section 430L. The large diameter section 450L (second part) neighbors the small diameter section 460L (first part) and is positioned above the small diameter section 460L.

That is, the small diameter section 440L is positioned between the large diameter section 450L that is an upper second part and the large diameter section 430L that is a lower second part. The axle supporting section 420L is positioned below the large diameter section 430L.

The outer surfaces of the large diameter sections 430L, 450L are preferably shot blasted. Therefore, the outer surfaces of the large diameter sections 430L, 450L have more roughness and less luster than those of the small diameter sections 440L, 460L, which have machined surfaces.

Also, because a black anodization treatment is performed on the outer surfaces of the outer tube 410L, the outer surfaces of the large diameter sections 430L, 450L have a mat black exterior, compared to the small diameter sections 440, 460L.

In the present embodiment, the large diameter section 430L has a brake caliper attaching section 431. Also, the large diameter section 450L has another brake caliper attaching section 451. The brake caliper 21a (see FIG. 1) is attached to the brake caliper attaching sections 431, 451. In this embodiment, the brake caliper attaching sections 431, 451 together form an equipment attaching section.

Further, the large diameter section 450L has fender attaching sections 452, 453. The front fender 22 (see FIG. 1) is attached to the fender attaching sections 452, 453. In this embodiment, the brake caliper 21a and the front fender 22 form pieces of equipment.

Additionally, although FIGS. 3 and 4 are the side elevational view and the front elevational view of the left shock absorber 400L, respectively, the right side absorber 400R also has a similar configuration to the left side shock absorber 400L.

A method for manufacturing a shock absorber 400L, 400R for use in forming a front fork 40 will now be described. Specifically, with reference to FIG. 5, one embodiment of a manufacturing method for the outer tube 410L (410R) will be described.

Figure 5:
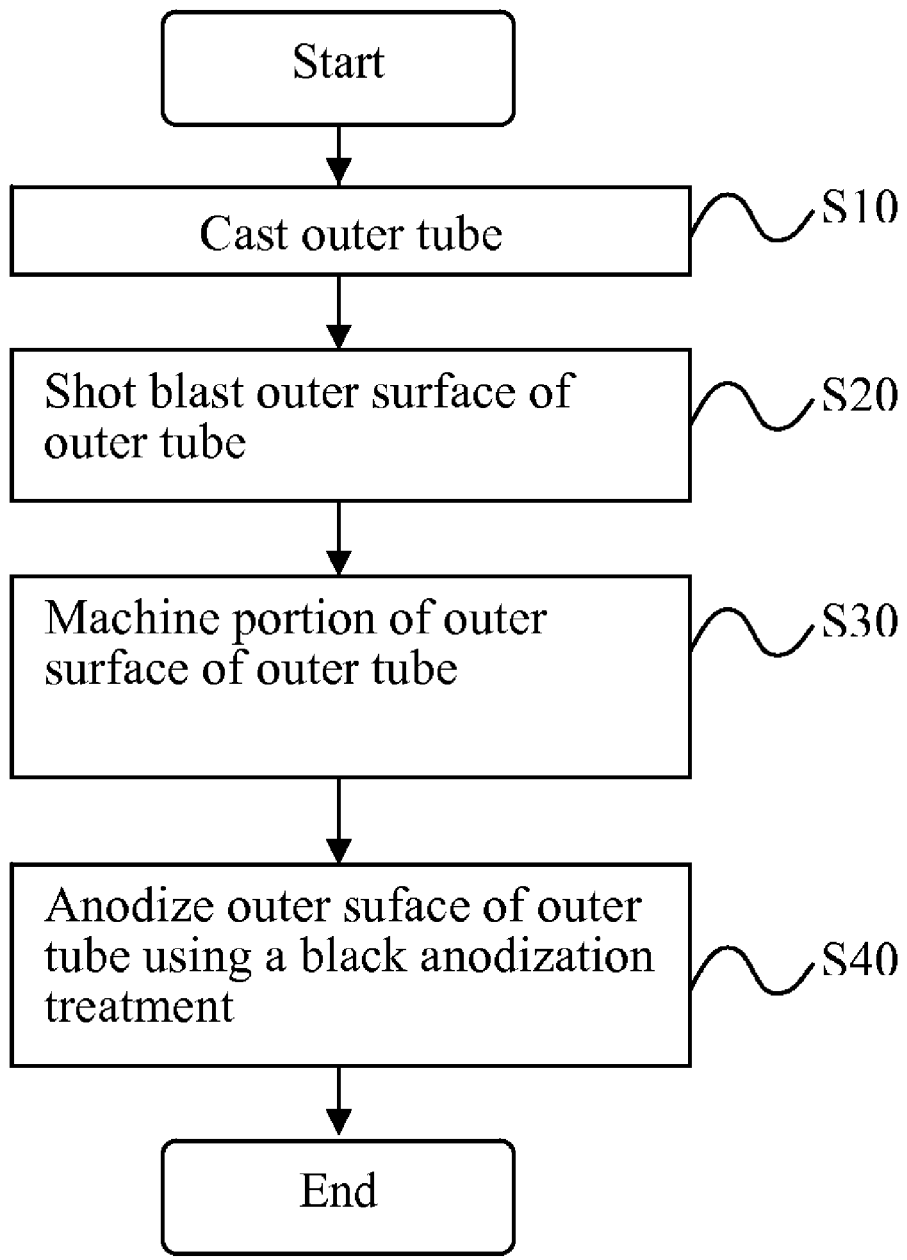
FIG. 5 is a manufacturing work flowchart for constructing a shock absorber in accordance with embodiment of the present invention.

As shown in FIG. 5, at a step S10, the outer tube 410L is cast.

At a step S20, the outer surface of the outer tube 410L is shot blasted. Additionally, iron powder or silica sand can be used, for example, to perform the shot blasting.

At a step S30, work for obtaining luster in a part of the outer surface of the outer tube 410L is performed. Specifically, the small diameter sections 440L, 460L are machined, and, as a result, the small diameter sections 440L, 460L have less outer surface roughness and more luster than the large diameter sections 430L, 450L.

At a step S40, and after the small diameter sections 440L, 460L are machined, the outer surface of the outer tube 410L is anodized. Preferably, the outer surface of the outer tube 410L is anodized using a black anoization treatment.

In the front fork 40, the small diameter sections 440L, 460L have less outer surface roughness and more luster than the large diameter sections 430L, 450L. Also, the brake caliper attaching sections 431, 451 or the like to which the equipment of the motorcycle 10, such as the brake caliper 21a, is attached are provided in the large diameter sections 430L, 450L.

Therefore, the exterior of shock absorber 400L can be made to look like a two-piece structure formed with the outer tube 410L and a separate bracket without using the separate bracket. Specifically, the large diameter sections 430L, 450L produce the image of the separate bracket.

Further, in this embodiment, the front fork 40 is used as a normal stand type fork. And, because the small diameter sections 440L, 460L of the outer tube 410L have more luster than the large diameter sections 430L, 450L, they produce the image or appearance of the inner tube of the reverse stand type fork. That is, although using the normal stand type fork, the image or appearance of the reverse stand type fork can be produced.

In this embodiment, shot blasting is made onto the outer surface of the large diameter sections 430L, 450L. Therefore, the large diameter sections 430L, 450L have less luster than the small diameter sections 440L, 460L because the outer surfaces of the small diameter sections 440L, 460L are machined. Therefore, the small diameter sections 440L, 460L have more luster than the large diameter sections 430L, 450L.

Further, in this embodiment, the small diameter sections 440L, 460L and the large diameter sections 430L, 450L are adjacent each other in the longitudinal direction of the left side shock absorber 400L. Also, the small diameter section 440L of the outer tube 410L is positioned between the large diameter section 450L that is the upper second part and the large diameter section 430L that is the lower second part. Further, the axles supporting section 420L is positioned below the large diameter section 430L. That is, the large diameter sections 430L, 450L can further produce the image or appearance that the sections 430L, 450L are separate from the small diameter sections 440L, 460L.

In this embodiment, the outer surface of the outer tube 410L is preferably anodized, preferably using a black anodizaton treatment. Therefore, the weather resistance of the outer tube 410L can be enhanced. If a black anodization treatment is provided, the so-called "darkness" that may happen to appear by making an anodization treatment onto a casting of an aluminum alloy can be inconspicuous.

Although contents of the present invention have been disclosed through the embodiments of the present invention described above, the invention is not limited to the embodiments described above and illustrated in the drawings. Indeed, the disclosure may provide the skilled persons in the art with various alternatives.

For example, it is not necessary to anodize the outer surface of the outer tube 410L. Also, the outer surfaces of the large diameter sections 430L, 450L are not required to be shot blasted. Further, the outer surfaces of the small diameter sections 440L, 460L do not necessarily require machining.

In addition, the small diameter sections 440L, 460L only require to be worked to have less outer surface roughness than the large diameter sections 430L, 450L. Thus, any work other than machining that creates satisfactory luster is also applicable.

Further, in the above embodiment, the small diameter section (for example, small diameter section 440L) and the large diameter section (for example, large diameter section 430L) are adjacent each other. As a result, the small diameter sections and the large diameter sections are only required to be provided in the longitudinal direction of the left shock absorber 400L, and a section, other than the small diameter sections and the large diameter sections, may be interposed therebetween.

As thus described, it is a matter of course that the present invention includes various embodiments or the like which are not described herein. Accordingly, the scope of the present invention is to be determined only by the claims that follow.

What is claimed:

1. A shock absorber comprising:
    a cylindrical outer tube, wherein the outer tube includes:
    a first cylindrical portion having a first diameter; and
    a second cylindrical portion having a second diameter different from the first diameter, the second cylindrical portion having an outer surface roughness greater than an outer surface roughness of the first cylindrical portion; wherein
    the first cylindrical portion and the second cylindrical portion are adjacent to each other in a longitudinal direction of the outer tube; and
    the second cylindrical portion includes an equipment attaching section adapted for attaching a piece of equipment.

2. The shock absorber according to claim 1, wherein the outer surface of the second cylindrical portion includes a shot blasted surface.

3. The shock absorber according to claim 1, wherein the outer surface of the first cylindrical portion includes a machined surface.

4. The shock absorber according to claim 1, wherein the equipment attaching section is arranged to attach a brake caliper of a disk brake for a straddle vehicle.

5. The shock absorber according to claim 1, wherein the equipment attaching section is arranged to attach a mud guard of a straddle vehicle.

6. The shock absorber according to claim 1, wherein an outer surface of the outer tube, including the first cylindrical portion and the second cylindrical portion of the outer tube, includes an anodized surface.

7. The shock absorber according to claim 6, wherein the outer surface of the outer tube includes an anodized black surface.

8. A straddle vehicle comprising:
 a shock absorber comprising a cylindrical outer tube, wherein the outer tube includes:
 a first cylindrical portion having a first diameter; and
 a second cylindrical portion having a second diameter different from the first diameter, the second cylindrical portion having an outer surface roughness greater than an outer surface roughness of the first cylindrical portion; wherein
 the first cylindrical portion and the second cylindrical portion are adjacent to each other in a longitudinal direction of the outer tube; and
 the second cylindrical portion includes an equipment attaching section to which a piece of equipment is attached.

9. The straddle vehicle of claim 8, wherein the outer surface of the second cylindrical portion includes a shot blasted surface.

10. The straddle vehicle of claim 8, wherein the outer surface of the first cylindrical portion includes a machined surface.

11. The straddle vehicle of claim 8, wherein a brake caliper of a disk brake is attached to the equipment attaching section.

12. The straddle vehicle of claim 8, wherein a mud guard is attached to the equipment attaching section.

13. The straddle vehicle of claim 8, wherein an outer surface of the outer tube, including the first cylindrical portion and the second cylindrical portion of the outer tube, includes an anodized surface.

14. The straddle vehicle of claim 13, wherein the outer surface of the outer tube includes an anodized black surface.

15. The straddle vehicle according to claim 8, wherein the shock absorber includes an axle supporting section arranged to support an axle of a front wheel;
 the first cylindrical portion of the outer tube is arranged between an upper second cylindrical portion and a lower second cylindrical portion; and
 the axle supporting section is positioned below the lower second cylindrical portion.

* * * * *